(12) United States Patent
Koster

(10) Patent No.: US 6,508,487 B2
(45) Date of Patent: Jan. 21, 2003

(54) INFLATABLE STRUCTURE SYSTEM AND METHOD FOR USING THE SAME

(75) Inventor: Steven A. Koster, Phoenix, AZ (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/919,897

(22) Filed: Aug. 2, 2001

(65) Prior Publication Data

US 2002/0027340 A1 Mar. 7, 2002

Related U.S. Application Data

(60) Provisional application No. 60/223,974, filed on Aug. 9, 2000.

(51) Int. Cl.$^7$ ............................................. B60R 21/22
(52) U.S. Cl. ..................... 280/730.2; 280/733; 280/749
(58) Field of Search ............................... 280/730.2, 743.2, 280/733, 730.1, 749

(56) References Cited

U.S. PATENT DOCUMENTS

| | | | |
|---|---|---|---|
| 5,322,322 A | 6/1994 | Bark et al. | |
| 5,462,308 A | 10/1995 | Seki et al. | |
| 5,480,181 A | 1/1996 | Bark et al. | |
| 5,588,672 A | 12/1996 | Karlow et al. | |
| 5,788,270 A | 8/1998 | Haland et al. | |
| 5,839,753 A | 11/1998 | Yaniv et al. | |
| 6,095,551 A | 8/2000 | O'Docherty | |
| 6,099,029 A | 8/2000 | Haland et al. | |
| 6,149,195 A | * 11/2000 | Faigle | 280/749 |
| 6,168,191 B1 | 1/2001 | Webber et al. | |
| 6,168,194 B1 | 1/2001 | Cuevas et al. | |
| 6,203,058 B1 | 3/2001 | Elqadah et al. | |
| 6,308,982 B1 | * 10/2001 | Wallner et al. | 280/730.2 |
| 6,375,216 B1 | * 4/2002 | Eschbach | 280/730.1 |
| 6,378,897 B1 | * 4/2002 | Butters et al. | 280/730.2 |

OTHER PUBLICATIONS

International Search Report, Apr. 23, 2002.

* cited by examiner

Primary Examiner—Paul N. Dickson
Assistant Examiner—David R. Dunn
(74) Attorney, Agent, or Firm—Shaw Pittman LLP

(57) ABSTRACT

A system and method for deploying a belt-line inflatable structure with substantial axial tension, the system including an inflatable structure serial assembly held at its ends by two static anchors. The serial assembly can be independent inflatable structures connected together, or one continuous inflatable structure. One or more dynamic anchors, mounted opposite the static anchors, restrains the serial assembly at an intermediate portion of the serial assembly such that the serial assembly has a first axis between the one static anchor and the one or more dynamic anchors and a second axis between the other static anchor and the one or more dynamic anchors. The dynamic anchor(s) allow the serial assembly to move axially along the first axis and the second axis and to equalize the axial tension of the serial assembly along the first and second axes. The system can further include a shield covering the inflatable structures.

39 Claims, 12 Drawing Sheets

INFLATABLE STRUCTURE SYSTEM AND METHOD FOR USING THE SAME

This application claims the benefit of the filing date of U.S. Provisional Application No. 60/223,974, filed Aug. 9, 2000.

BACKGROUND

1. Field of the Invention

The present invention relates to inflatable structures, and more particularly, to a system and method for providing side impact and rollover protection in a vehicle from the roof rail to the belt line.

2. Background of the Invention

Inflatable structures are widely used to protect vehicle occupants during rapid vehicle deceleration, such as the deceleration encountered in a collision. Vehicle manufacturers place inflatable structures throughout vehicles in strategic locations where occupants can be expected to impact hard vehicle components. Generally, manufacturers may place inflatable structures above and/or below the dashboard on both the driver and passenger side, and along the sides of the vehicle at both the head level just below the roof rail, and the hip level, or "belt-line" level, just above the door panel. The lower inflatable structures protect the leg, hip, and lower torso of the occupant, while the upper inflatable structures cushion the head and upper torso. For purposes of this specification, and as shown in FIG. 1, the belt line 100 is the bottom edge of the side window opening in an automobile door, while the roof rail 102 is the upper edge of the side window opening.

In a conventional installation, an inflatable structure is stowed in an uninflated state within a vehicle component, e.g., roof rail, as the dotted line 104 represents in FIG. 1.

The typical construction of an inflatable structure includes an inflatable chamber 106 with one cord or strap 108 attached at each end. The cords or straps (hereinafter referred to as "cords") attach the inflatable structure to anchor points 110 on the vehicle structure. Typically, these anchor points are statically mounted fasteners, e.g., M6 bolts. As used herein, statically mounted refers to an anchor that allows a cord to which it is attached to pivot around it, but not to move through it or around it.

Upon deployment, the inflatable structure inflates and emerges from its stowed location. The inflation fills the interior chamber of the inflatable structure, expands the walls of the inflatable structure, and reduces the overall length of the inflatable structure. The inflatable structure can be of any shape that substantially reduces in length when it inflates, such as a tubular or oval shape. As an example, inflatable tubular structures are described in U.S. Pat. No. 5,322,322 to Bark et al., which is assigned to the assignee of the present invention and is hereby incorporated by reference in its entirety. As another example, U.S. Pat. No. 5,788,270 to HÅland et al. describes another type of inflatable structure that reduces in length upon inflation.

The shorter axial length of a deployed inflatable structure pulls on the anchor points to which the inflatable structure is attached to produce substantial tension. This axial tension keeps the inflated inflatable structure in the desired deployed location, centered between the two anchor points. To provide side impact head protection for front and rear seat passengers, an inflatable structure is generally mounted to the upper portions of the A-pillar and the C-pillar of an automobile. FIG. 1 illustrates this typical prior art installation, with the inflatable structure attached to the A-pillar A and C-pillar C, and spanning the B-pillar B. Similarly, to provide side impact torso protection, an inflatable structure (not shown in FIG. 1) is attached to the lower portions of the A-pillar A and the C-pillar C of the vehicle.

As FIG. 1 illustrates, in the stowed position, the uninflated inflatable structure lies along a path 104 from its first anchor point 110, through the vehicle structure in which it is enclosed (e.g., roof rail 102), and to its second anchor point 110. In the deployed position, the inflatable structure extends along the shortest line connecting the two anchor points 110. Thus, the stowed length of the inflatable structure is greater than its deployed length. In addition, the closer the anchor points 110 are to belt line 100, the greater the stowed length is in proportion to the deployed length. Thus, a belt-line inflatable structure must reduce its length during deployment substantially more than an inflatable structure that is mounted at head level.

In addition, some vehicle geometries require belt-line inflatable structures to reduce their lengths even more. Vehicle platforms that have tall window openings greatly increase the proportion of stowed length to deployed length. For example, vehicles such as trucks, vans, and some sports-utility vehicles, have tall, narrow window openings that require a long stowed length up the pillars and around the roof rail, and a relatively short deployed length spanning the narrow window.

To provide adequate protection, an inflatable structure must develop considerable axial tension so that the inflatable structure maintains a rigid, impact-absorbing area that cushions an occupant's body from the hard vehicle components. In comparison to head level inflatable structures, attaining this axial tension is a significant challenge for belt-line mounted inflatable structures because of the greater difference in length between the stowed and deployed positions. The practical result of this geometry is that belt-line mounted inflatable structure do not achieve the desired tension for maximum occupant protection. In fact, with some trucks and other vehicles with tall windows, the proportion of stowed length to deployed length is too great, acceptable tension is unattainable, and belt-line deployment is impossible.

Thus, there remains a need for an inflatable structure system that provides adequate tension for belt-line applications.

SUMMARY OF THE INVENTION

The present invention is a system and method for deploying a lower, or belt-line, inflatable structure with substantial axial tension. The system, referred to herein as an inflatable structure system, includes an inflatable structure serial assembly held on its ends by two static anchors. The serial assembly can be independent inflatable structures connected together, or one continuous inflatable structure. One or more dynamic anchors, mounted opposite the static anchors, restrains the serial assembly at an intermediate portion of the serial assembly such that the serial assembly has a first axis between the one static anchor and the one or more dynamic anchors and a second axis between the other static anchor and the one or more dynamic anchors. The one or more dynamic anchors allow the serial assembly to move axially along the first axis and the second axis, to equalize the axial tension of the serial assembly along the first and second axes.

In an embodiment of the present invention, as shown in FIG. 2a, the inflatable structure system includes an upper inflatable structure 200, a lower or belt-line inflatable structure 204, an upper static anchor 202, a lower or belt-line static anchor 208, and at least one dynamic anchor 205. In a further embodiment, the inflatable structure system also includes a shield (not shown in FIG. 2a) covering both inflatable structures.

The two static anchors 202 and 208 are mounted on a vehicle structure (or member) opposite to a vehicle structure (or member) on which the at least one dynamic anchor 205 is mounted. For example, as in the embodiment of FIG. 2a, dynamic anchor 205 could be on A-pillar A and the two static anchors 202 and 208 could be on the C-pillar C. Of course, anchors 202, 208, and 205 could be mounted on any pillars (e.g., including a B-pillar), members, or other structures of a vehicle, so long as anchors 202 and 208 oppose dynamic anchor 205. As another example, dynamic anchor 205 could be on C-pillar C, with static anchors 202 and 208 on A-pillar A. Of the two static anchors, upper static anchor 202 is closer to roof rail 212 than belt-line (or lower) static anchor 208.

Upper inflatable structure 200 is attached to upper static anchor 202 and to belt-line inflatable structure 204. Belt-line inflatable structure 204 is attached to belt-line static anchor 208. Upper inflatable structure 200 and belt-line inflatable structure 204 are connected to form a serial assembly from upper static anchor 202 to belt-line static anchor 208. The at least one dynamic anchor 205 restrains the serial assembly at an intermediate portion of the serial assembly, such that the serial assembly changes direction at the intermediate portion. In this example, the intermediate portion is the point at which upper inflatable structure 200 and belt-line inflatable structure 204 are connected. As shown in FIG. 2a, a joining cord 203 connects inflatable structures 200 and 204 and serves as the intermediate portion. In this manner, the inflatable structures are fixed between upper static anchor 202 and belt-line static anchor 208, but can travel back and forth in an axial direction along the path from upper static anchor 202 to at least one dynamic anchor 205 and to belt-line static anchor 208.

As used herein, a dynamic anchor refers to a device that takes two non-opposing forces that would be applied to two independent inflatable structures and makes the forces opposing, such that the forces are applied against each other and are substantially equal. In support of this definition, FIG. 2b illustrates two independent, deployed inflatable structures 250 and 251. Inflatable structure 250 is held by two anchors 253 and 254, which apply forces $F_1$ and $F_2$ on inflatable structure 250, respectively. Likewise, inflatable structure 251 is held by two anchors 255 and 256, which apply forces $F_3$ and $F_4$ on inflatable structure 251, respectively. Therefore, as shown, forces $F_2$ and $F_4$ are the non-opposing forces 257 that a dynamic anchor would make opposing.

FIG. 2c illustrates an exemplary dynamic anchor 260 that applies forces $F_2$ and $F_4$ against each other to create opposing forces 258. Dynamic anchor 260 creates opposing forces 258 by allowing a cord 259 that connects the two inflatable structures 250 and 251 to move through dynamic anchor 260 or slide around it. In this embodiment, dynamic anchor 260 could be a bushing mounted on a shaft attached to a vehicle structure.

As another example, FIG. 2d shows a dynamic anchor 261 that is a first-class lever. Inflatable structure 250 is attached to one side of lever 261, while inflatable structure 251 is attached to the other side. In between, the fulcrum 262 of lever 261 is pivotally attached so that lever 261 can rotate, or teeter-totter, as represented by the arrow 263. This teeter-totter action causes force $F_2$ and force $F_4$ to oppose each other (opposing forces 258).

In another embodiment of the present invention, a dynamic anchor could be more than one dynamic anchor. In another embodiment, the position of a dynamic anchor could also be adjustable.

Returning to FIG. 2a, the components of the present invention stow in a vehicle structure, e.g., roof rail 212. Upon deployment, belt-line inflatable structure 204 and upper inflatable structure 200 inflate and drop from the vehicle structure. The inflation expands the chamber walls of inflatable structures 200 and 204, reduces the overall length of inflatable structures 200 and 204, and pulls the cords taut. In pulling the cords, upper inflatable structure 200 approaches a position in line between upper static anchor 202 and the dynamic anchor 205 to which it is held. Similarly, belt-line inflatable structure 204 approaches a position in line between belt-line static anchor 208 and the dynamic anchor 205 to which it is held. If a shield is included in the inflatable structure system, the inflatable structures expand the shield as the inflatable structures inflate into their desired deployment locations.

As the lengths of upper inflatable structure 200 and belt-line inflatable structure 204 decrease and the tension on the cords increases, joining cord 203 (which is wrapped around the at least one dynamic anchor 205) slides around the at least one dynamic anchor 205. The at least one dynamic anchor 205 allows joining cord 203 to slide, but restricts both upper inflatable structure 200 and belt-line inflatable structure 204 with respect to their tensile direction. Because the cords of upper inflatable structure 200 and belt-line inflatable structure 204 are joined, the inflatable structures move in series. In this manner, axial tension substantially equalizes between the two inflatable structures, allowing upper inflatable structure 200 to compensate for the lower tension of belt-line inflatable structure 204. Therefore, the system provides a consistent acceptable tension across both of the inflatable structures and, if a shield is included, across the entire surface area of the shield.

Thus, the present invention provides an improved inflatable structure system that produces satisfactory axial tension for a belt-line inflatable structure. Improving the axial tension of the belt-line inflatable structure by coupling it with the upper inflatable structure increases the effective area of impact protection, extending it to the belt line of the vehicle.

Although the figures of this application illustrate embodiments of the present invention that use inflatable tubular structures, one of ordinary skill in the art would appreciate that the present invention is equally applicable to other inflatable structures as well. For this reason, and notwithstanding the particular benefits associated with using inflatable tubular structures, the systems and methods described herein should be considered broadly useful for any inflatable structure that substantially reduces in length when it inflates.

Accordingly, an object of the present invention is to provide impact protection and protection from partial ejection from the roof rail to the belt-line of a vehicle.

Another object of the present invention is to provide an inflatable structure system that contributes to the protection of a vehicle occupant's torso.

Another object of the present invention is to provide a belt-line inflatable structure with adequate axial tension.

Another object of the present invention is to compensate for the reduced axial tension of one inflatable structure with the axial tension of another inflatable structure.

These and other objects of the present invention are described in greater detail in the detailed description of the invention, the appended drawings, and the attached claims.

DETAILED DESCRIPTION OF THE INVENTION

Figure 1:
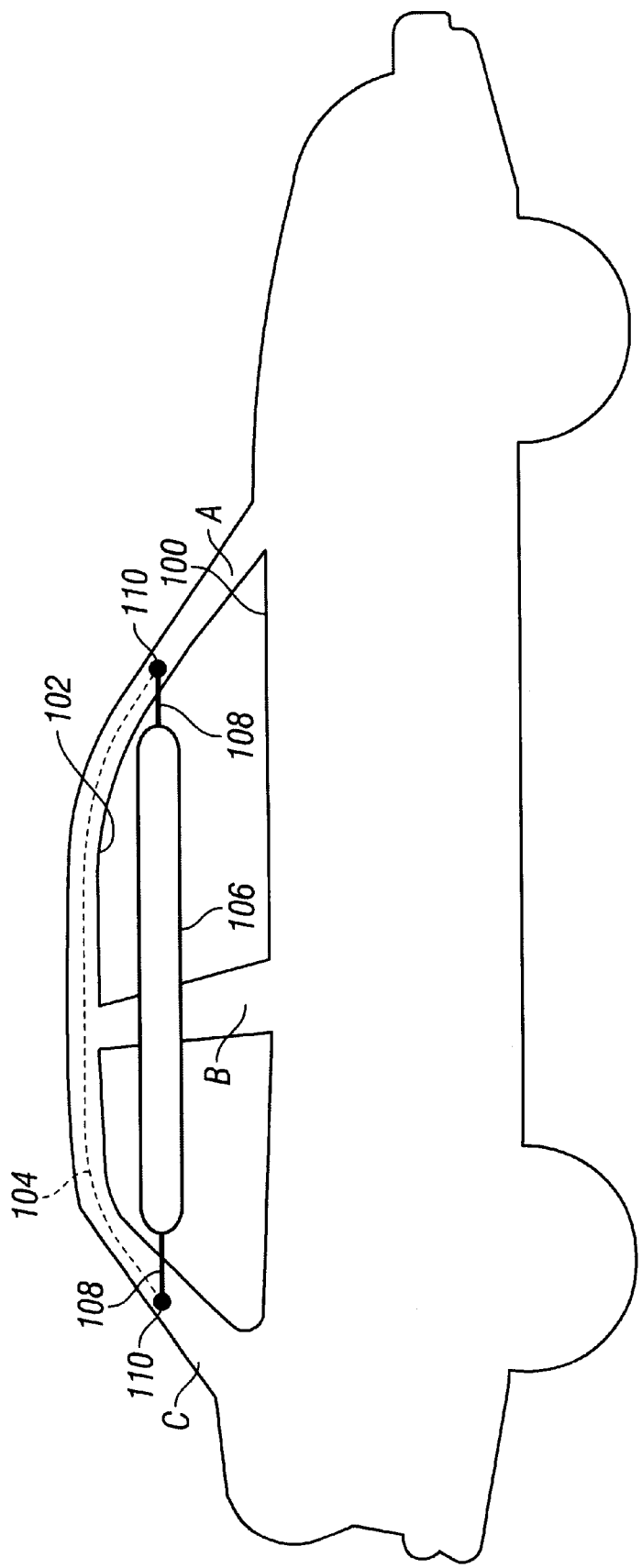
FIG. 1 is a schematic diagram of a prior art inflatable structure attached to a vehicle at the A-pillar and the C-pillar, and shown in undeployed and deployed conditions, as viewed from inside the vehicle.
Figure 2A:
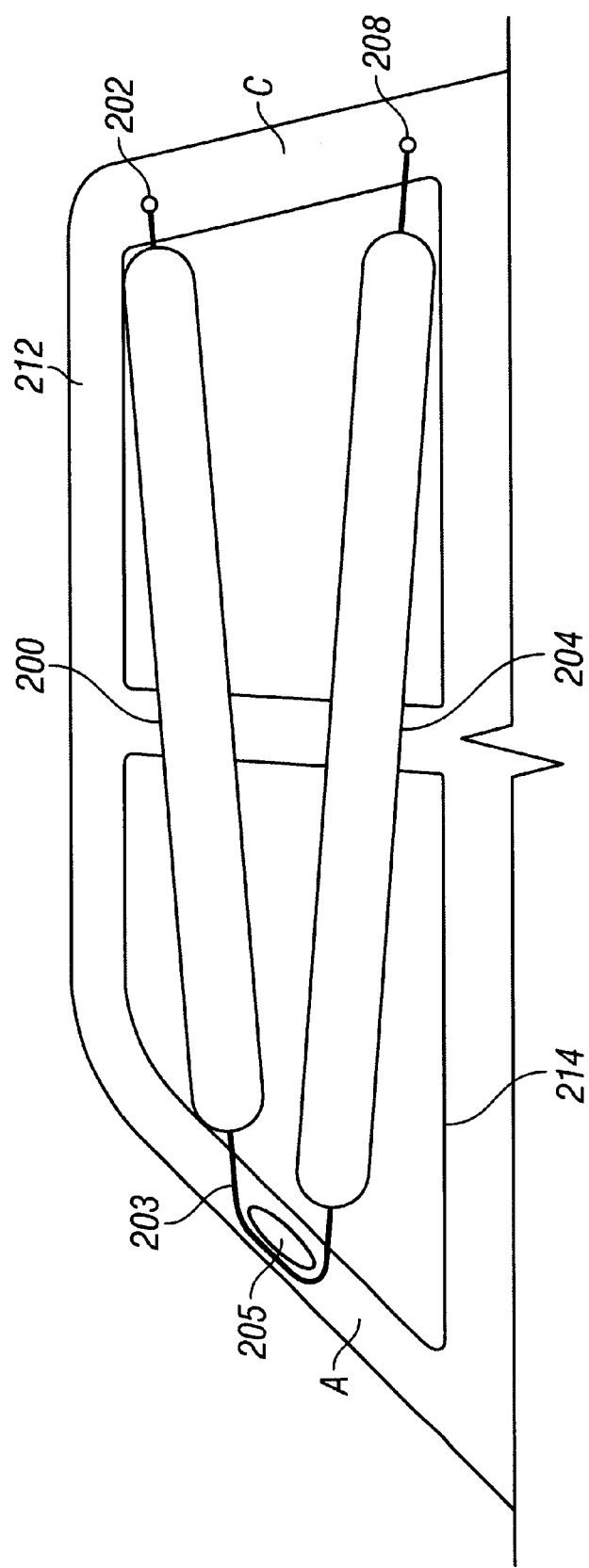
FIG. 2a is a schematic diagram of an embodiment of the inflatable structure system of the present invention, having one dynamic anchor and no shield, and shown in a deployed condition, as viewed from inside the vehicle.
Figure 2B:
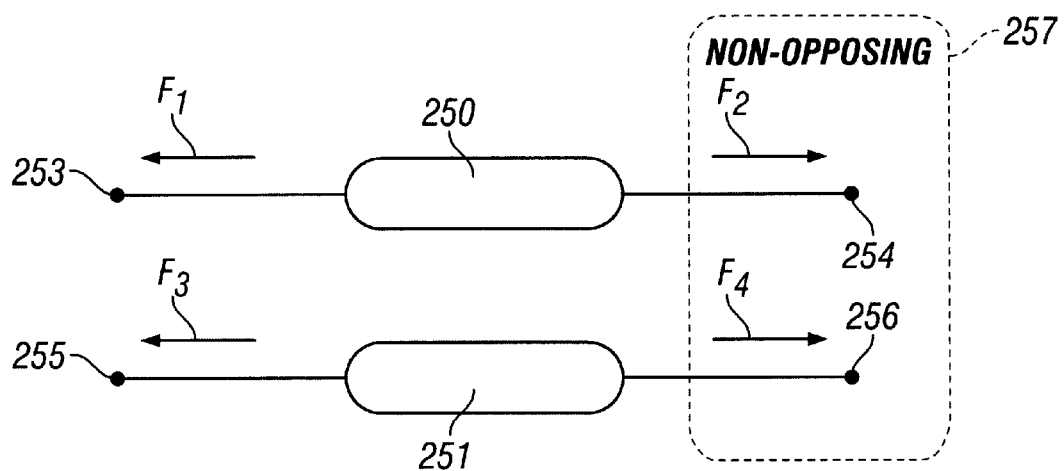
FIG. 2b is a schematic diagram illustrating two non-opposing forces applied to two independent, deployed inflatable structures.
Figure 2C:
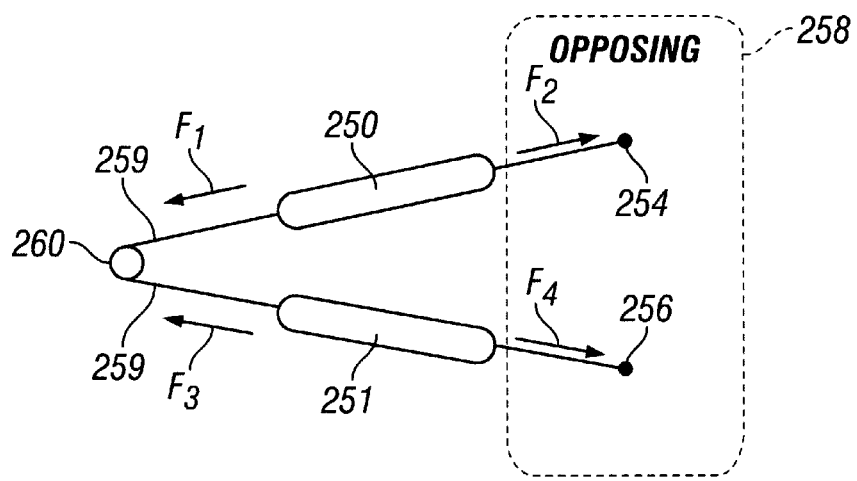
FIGS. 2c and 2d illustrate exemplary dynamic anchors, according to embodiments of the present invention.
Figure 2D:
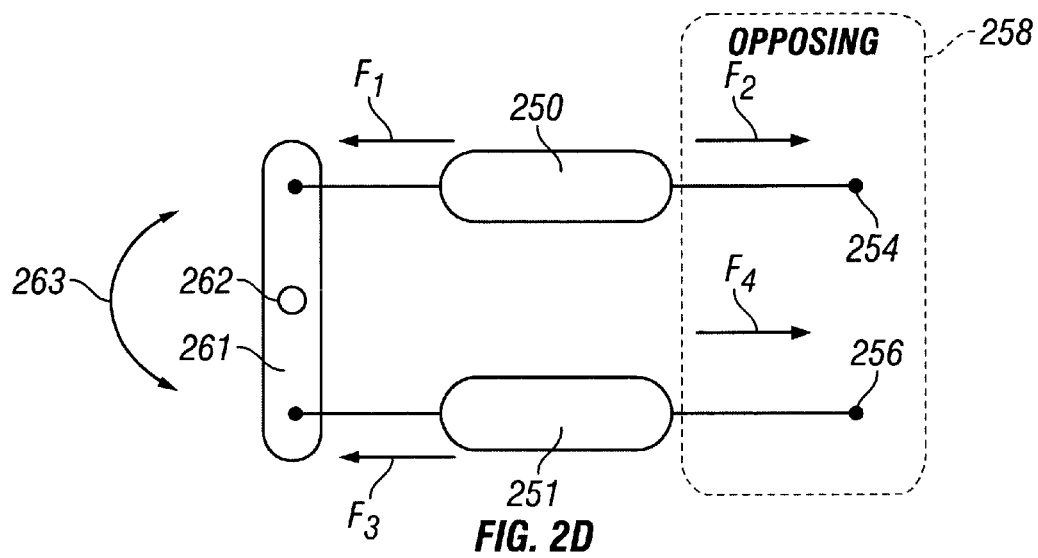
Figure 3:
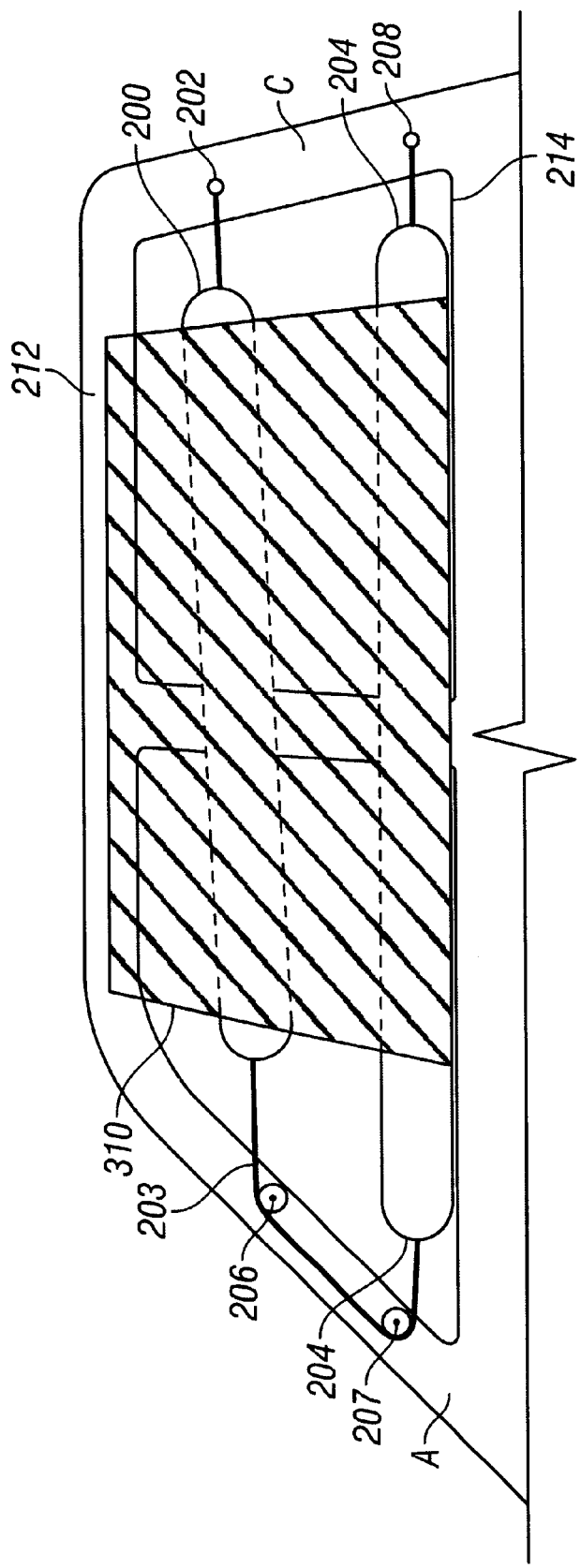
FIG. 3 is a schematic diagram of an embodiment of the inflatable structure system of the present invention, having two dynamic anchors and a shield, and shown in a deployed condition, as viewed from inside the vehicle.

Referring to FIG. 3, an embodiment of the present invention includes an upper inflatable structure 200, an upper static anchor 202, a lower or belt-line inflatable structure 204, a lower or belt-line static anchor 208, and at least one dynamic anchor 206 and/or 207. A further embodiment includes a shield 310. Upper inflatable structure 200 is secured above belt-line inflatable structure 204 by upper static anchor 202 and by dynamic anchor 206. Belt-line inflatable structure 204 is secured below upper inflatable structure 200 by belt-line static anchor 208 and dynamic anchor 207. Shield 310 covers upper inflatable structure 200 and belt-line inflatable structure 204 from roof rail 212 to belt-line 214. Static anchors 202 and 208 are mounted to a vehicle structure, e.g., C-pillar C, while the at least one dynamic anchors 206 and/or 207 are mounted to an opposing vehicle structure, e.g., A-pillar A.

As shown in FIG. 3, one cord 300 of upper inflatable structure 200 is attached to upper static anchor 202 on the C-pillar C. The other cord 302 of upper inflatable structure 200 is joined with one cord 304 of belt-line inflatable structure 204. The joined cords of upper inflatable structure 200 and belt-line inflatable structure 204 are wrapped around dynamic anchors 206 and 207 on the A-pillar A. The other cord 306 of belt-line inflatable structure 204 is attached to static anchor 208 on the C-pillar C. Shield 310 covers both upper inflatable structure 200 and belt-line inflatable structure 204 to provide the vehicle occupant with a large impact absorption area and to reduce the likelihood of partial ejections. Shield 310 provides protection from roof rail 212 to belt line 214.

Figure 4:
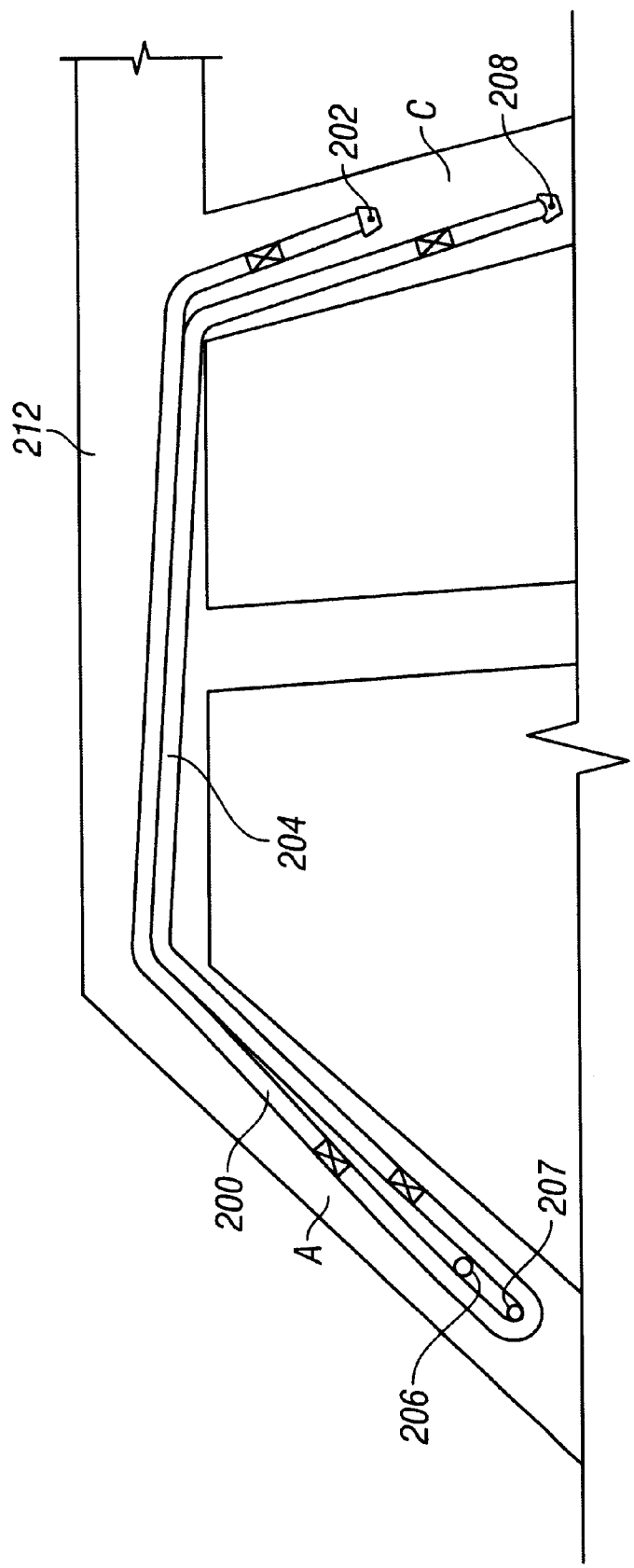
FIG. 4 is a schematic diagram of an embodiment of the inflatable structure system of the present invention, having two dynamic anchors, and shown in stowed position, as viewed from inside the vehicle.

In an undeployed state, the inflatable structure system of the present invention stows in a vehicle structure, e.g., the roof rail. FIG. 4 shows upper inflatable structure 200 and belt-line inflatable structure 204 stowed in A-pillar A, roof rail 212, and C-pillar C of the vehicle structure. (Shield 310 has been omitted in FIG. 4 for clarity.) Upon deployment, upper inflatable structure 200 and belt-line inflatable structure 204 expand and emerge from roof rail 212. As shown in FIG. 3, as upper inflatable structure 200 and belt-line inflatable structure 204 expand, their lengths reduce, thereby pulling the cords against static anchors 202 and 208 and around the at least one dynamic anchor 206 and 207.

Attaching upper inflatable structure 200 to belt-line inflatable structure 204 enables the inflatable structures to move axially in series along the path joining upper static anchor 202 to dynamic anchor 206 to dynamic anchor 207 to belt-line static anchor 208. Thus, as the inflatable structures expand, reduce in length, and pull along this path, the axial tension equalizes between upper inflatable structure 200 and belt-line inflatable structure 204. The inflatable structure system of the present invention thus equalizes axial tension between upper inflatable structure 200 and belt-line inflatable structure 204 to provide roof rail to belt-line impact and ejection protection that meets or exceeds safety standards.

Although FIG. 3 illustrates the use of two dynamic anchors (anchors 206 and 207), the number of dynamic anchors depends largely on the desired location and alignment of the inflatable structures, and the specific configuration of the vehicle in which the system is installed. Two dynamic anchors paired with two static anchors provide two levels at which to place the inflatable structures. Each mating static anchor and dynamic anchor is positioned substantially level with the other anchor on either side of the window opening, so that an inflatable structure deployed between them comes to rest at a location that protects a critical part of the occupant's body, e.g., the occupant's head or torso. A configuration with two static and two dynamic anchors provided at two levels is suitable for most vehicle configurations.

However, an alternate embodiment uses one dynamic anchor to minimize the number of system parts. With one dynamic anchor, although the inflatable structures deploy in a generally V-shaped configuration, in a suitable vehicle configuration the inflatable structure could still cover the critical occupant impact areas.

Alternatively, the dynamic anchor could be long so as to occupy a substantial portion of the vehicle structure. Having the cords wrapped around the longer anchor provides greater separation between the inflatable structures, avoids the V-shaped configuration, and enables the inflatable structures to deploy in a more level position. FIG. 2 shows this aspect of this embodiment of the present invention, in which the at least one dynamic anchor 205 is substantially oval-shaped. For these longer anchors, to facilitate movement of the cords in the axial direction, the dynamic anchor preferably rotates or has a low friction surface, as described below.

In another embodiment, three or more dynamic anchors could be used to enable better control of the cord deployment and to fine-tune alignment and location of the inflatable structure.

In an embodiment of the present invention, a dynamic anchor is preferably a bushing with a central shaft that mounts to the vehicle frame. The bushing outer surface is preferably made of a durable, high-wear material that minimizes friction, e.g., DELRIN™. The bushing inner shaft is preferably made of a high shear-strength material (e.g., steel) that can withstand the loading imposed by the inflatable structures. As an alternative to bushings, bearings or pulleys having similar structural and functional characteristics could also be used. In addition, any structure satisfying the structural and functional characteristics of the dynamic anchors could be used, including a broad range of devices such as eyehooks, pins, rollers, gears, belts, and tracks. Anchors such as the belts and gears would rotate to allow movement of the cords.

Figure 5:
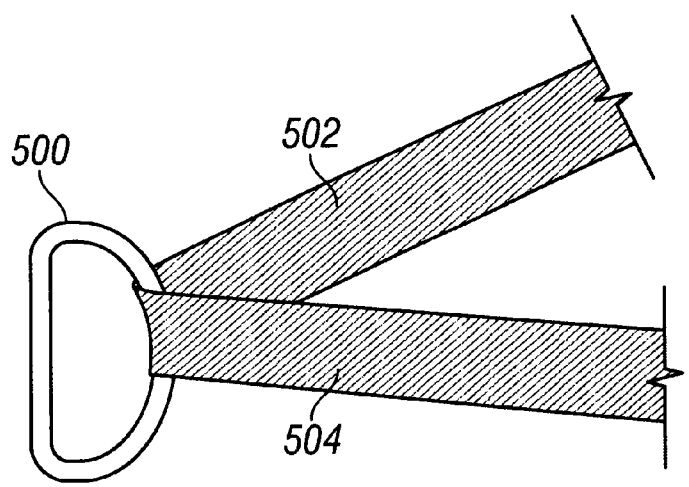
FIG. 5 is a schematic diagram of a D-ring dynamic anchor according to an embodiment of the present invention.

In an alternate embodiment of the present invention, the dynamic anchor is a D-ring, such as the D-ring 500 shown in FIG. 5. D-ring 500 mounts to the vehicle structure and receives the connected webbing (i.e., cords) of upper inflatable structure 200 and belt-line inflatable structure 204. Upper webbing 502 connects to upper inflatable structure 200, while lower webbing 504 connects to belt-line inflatable structure 204. An example of suitable webbing for use with D-ring 500 is 1-inch nylon webbing. Optionally, braid can also be used in place of webbing if so desired. D-ring 500 allows the connected upper webbing 502 and lower webbing 504 to move freely through D-ring 500, allowing the tension between upper inflatable structure 200 and belt-line inflatable structure 204 to equalize.

For deployment, in an embodiment of the present invention, dual inflators mounted inside the two inflatable structures inflate the inflatable structures. These integral inflators eliminate the need for fill hoses, thereby saving costs and speeding deployment time. Alternatively, a single remote inflator connected to the inflatable structures by a splitter and fill hoses could inflate the inflatable structure system. Also, alternatively, dual remote inflators could be used.

In an embodiment of the present invention, the cords of upper inflatable structure 200 and belt-line inflatable structure 204 are joined in series by an attaching means strong enough to withstand the forces of deployment. Preferably, the attaching means is a sew joint. However, other attachments such as fasteners could be used. Alternatively, the inflatable structures could be manufactured with a continuous cord connecting the inflatable structures together. In any case, the entire length of the inflatable structure system, from upper static anchor 202 to belt-line static anchor 208, must be structurally capable of withstanding the forces of deployment.

Figure 6:
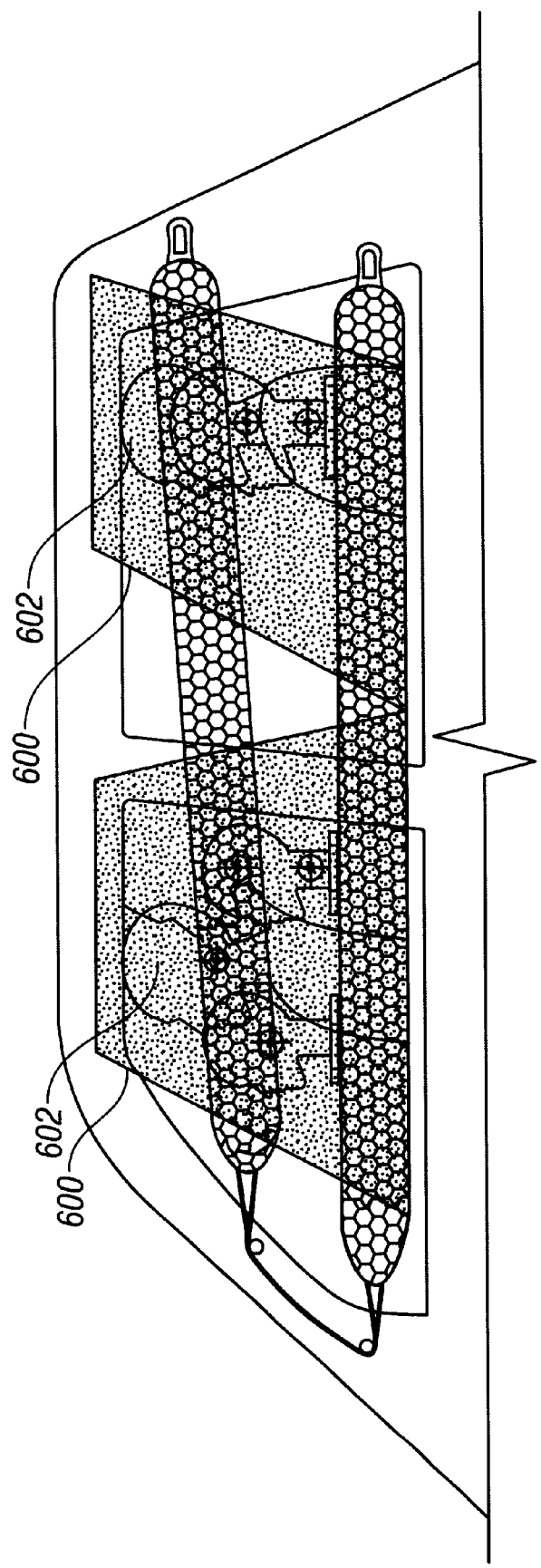
FIG. 6 is a schematic diagram of an embodiment of the inflatable structure system of the present invention, having two dynamic anchors and a shield configured in sections that generally correspond to the positions of the vehicle occupants, shown in a deployed condition, as viewed from inside the vehicle.

In another embodiment of the present invention, as shown in FIG. 3, shield 310 covers the entire length of upper inflatable structure 200 and belt-line inflatable structure 204 to provide protection substantially along the entire length of the window opening, from roof rail 212 to belt-line 214. Alternatively, shield 310 could be strategically located where the occupants are most likely to impact it. This strategic locating of the shield reduces the amount of material in the shield, saves material costs, and decreases the deployment time. FIG. 6 shows an embodiment of the present invention deployed with a shield 600 configured in sections that generally correspond to the positions of the vehicle occupants 602.

Figure 7B:
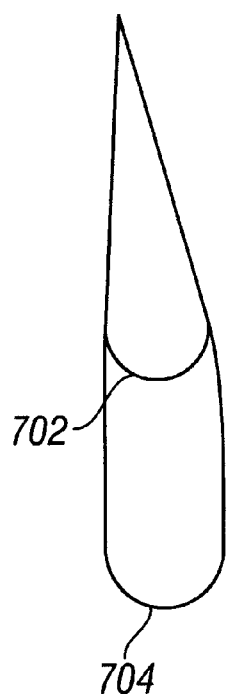
FIG. 7b is a schematic diagram of a cross-sectional view of a shield in a deployed condition, according to an embodiment of the present invention.
Figure 7C:
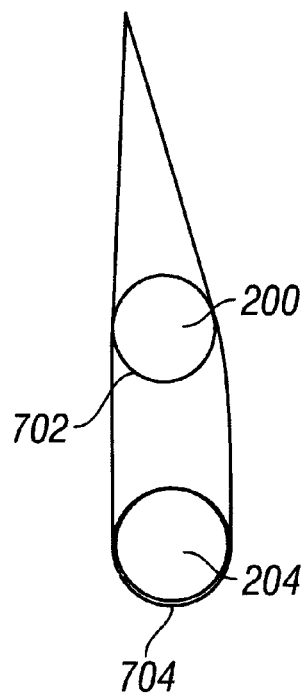
FIG. 7c is a schematic diagram of a cross-sectional view of a shield in a deployed condition holding an upper inflatable structure and a belt-line inflatable structure, according to an embodiment of the present invention.
Figure 7A:
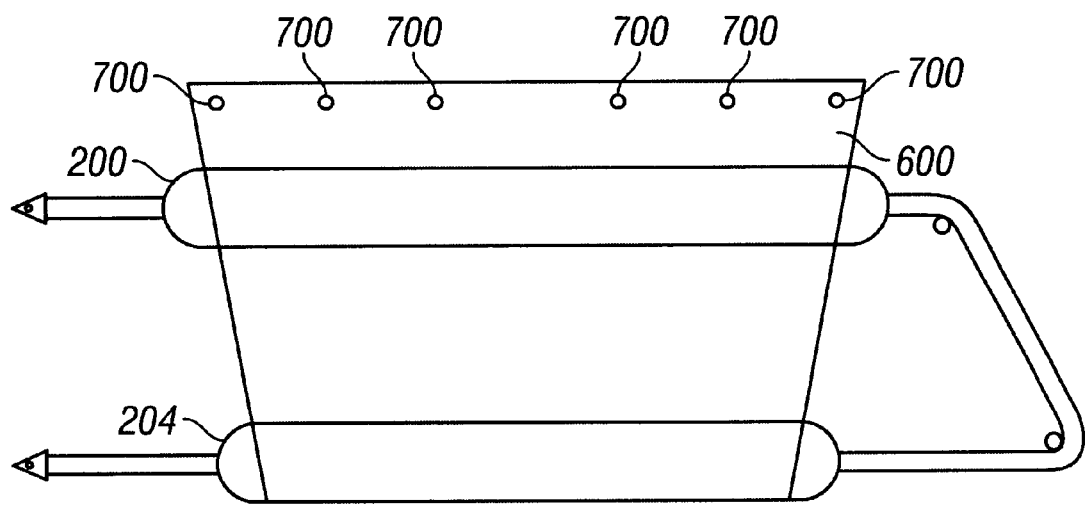
FIG. 7a is a schematic diagram of a shield in a deployed condition, according to an embodiment of the present invention.

According to an embodiment of the present invention, FIGS. 7a–7c illustrate how shield 600 attaches to the vehicle structure and holds upper inflatable structure 200 and belt-line inflatable structure 204. Preferably, fasteners 700 affix the top of shield 600 to the roof rail of a vehicle, as shown in FIG. 7a. Examples of suitable fasteners include stitching, clips, and push-fitting stud plates. As shown in the axial views of FIGS. 7b and 7c, shield 600 includes saddles 702 and 704, which cradle upper inflatable structure 200 and belt-line inflatable structure 204, respectively. This configuration provides a controlled deployment, ensuring that upper inflatable structure 200 and belt-line inflatable structure 204 inflate properly and attain the desired axial tension.

Figure 8:
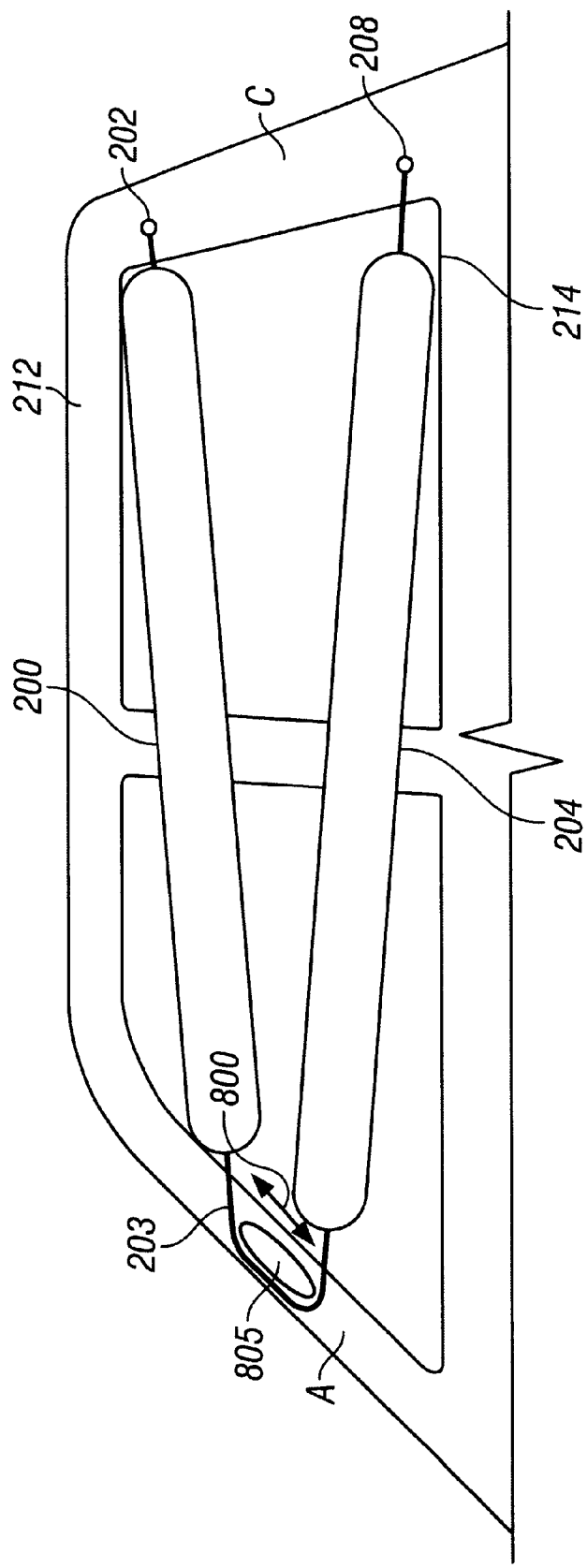
FIG. 8 is a schematic diagram of an embodiment of the inflatable structure system of the present invention, having an adjustable dynamic anchor, and shown in a deployed position, as viewed from inside the vehicle.

FIG. 8 illustrates an alternate embodiment of the present invention in which a dynamic anchor 805 adjusts up or down on A-pillar A to position inflatable structures 200 and 204 at different levels and angles. As represented by arrow 800 in FIG. 8, the adjustable positioning accommodates different occupant statures to provide optimal impact protection for each. The position of adjustable dynamic anchor 805 could be manually set by the occupant or could automatically change in relation to the size of the occupant or the adjustment of the seat or headrest. For example, adjustable dynamic anchor 805 could be mechanically coupled to the headrest so that when the height of the headrest changes, anchor 805 moves accordingly. Alternatively, sensors placed inside the vehicle could detect the position of the headrest or the size of the occupant, and signal an actuating mechanism (such as a motor) to move anchor 805 to an appropriate position along A-pillar A.

In addition, although FIG. 8 shows dynamic anchor 805 adjusting generally along the axis of A-pillar A, dynamic anchor 805 could adjust in any other direction as well. For instance, dynamic anchor 805 could adjust along an axis parallel to belt-line 214 or along an axis perpendicular to belt-line 214. These other directions of adjustment would accommodate situations in which the stowed length of inflatable structures must be reduced to minimize strain on the materials.

Thus, for example, while stowed, dynamic anchor 805 could be positioned toward roof rail 212 and/or back toward C-pillar C to reduce the stowed length along roof rail 212 between dynamic anchor 805 and static anchors 202 and 208. Then, upon deployment, dynamic anchor 805 could move to a location down toward belt-line 214 and/or further away from C-pillar C to provide optimal deployment positioning between dynamic anchor 805 and static anchors 202 and 208. A mechanical mount or a motor could adjust dynamic anchor 805 between these stowed and deployed positions. An example of a mechanical mount suitable for this application is described in co-pending application U.S. Ser. No. 09/630,606, titled "Dynamically Deployed Device Anchor and Assembly," filed Aug. 2, 2000, which is assigned to the assignee of the present invention and is hereby incorporated by reference in its entirety. The mechanical mount described therein could adjust dynamic anchor 805 from a stowed position on roof rail 212 to a deployed position that is below roof rail 212 and not necessarily along A-pillar A.

Figure 9:
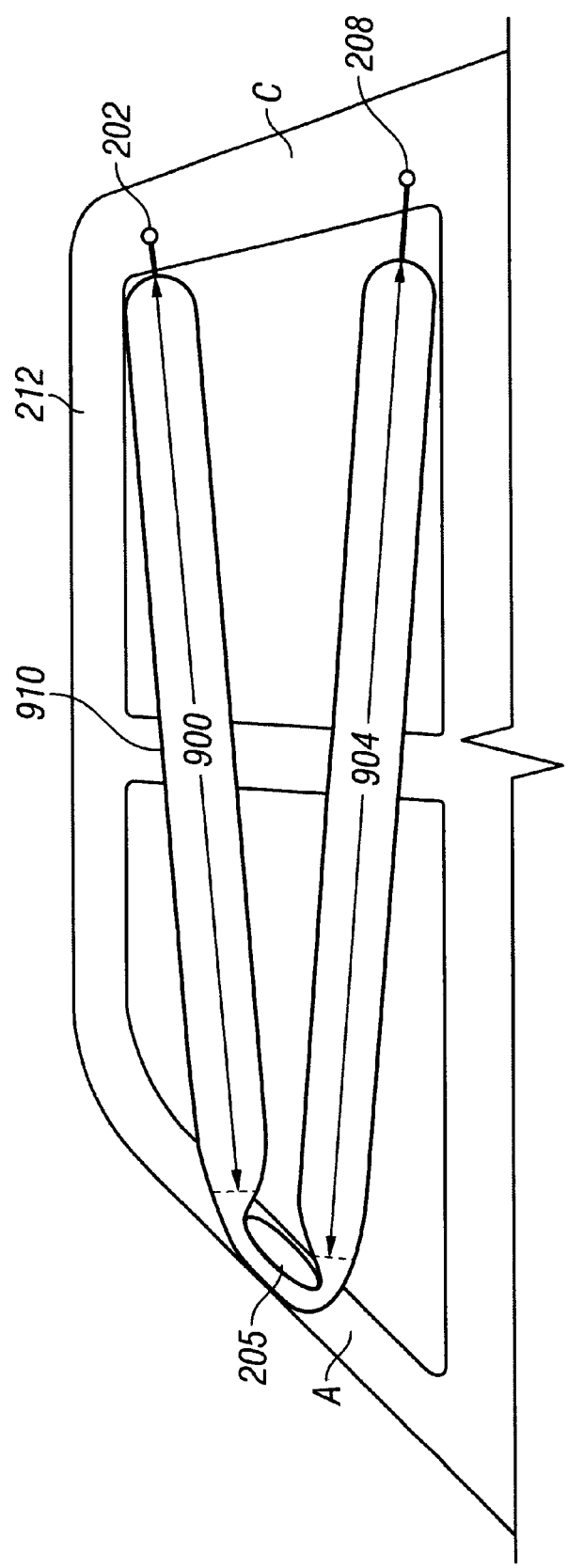
FIG. 9 is a schematic diagram of an embodiment of the inflatable structure system of the present invention, having a continuous inflatable structure, and shown in a deployed position, as viewed from inside the vehicle.

In another embodiment of the present invention, FIG. 9 shows a continuous inflatable structure 910 deployed from static anchor 202 to dynamic anchor 205 to static anchor 208. The portion of continuous inflatable structure 910 from static anchor 202 to dynamic anchor 205 forms an upper inflatable structure 900, similar to upper inflatable structure 200 of FIG. 2. Likewise, the portion of continuous inflatable structure 910 from dynamic anchor 205 to static anchor 208 forms a lower or belt-line inflatable structure 904, similar to belt-line inflatable structure 204 of FIG. 2. Having a continuous inflatable structure 910 eliminates the need for joining cords, webbing, sew joints, and other connecting means.

In changing direction around dynamic anchor 205, continuous inflatable structure 910 slides over dynamic anchor 205, equalizing the tension along the length of continuous inflatable structure 910. Continuous inflatable structure 910 may be pinched at anchor 205, with little or no interior volume. To compensate for this pinching and to minimize the time needed for deployment, this embodiment optionally includes two inflators to independently inflate the two portions 900 and 904 of continuous inflatable structure 910. As another option, this embodiment could include a shield, as described above.

Figure 10:
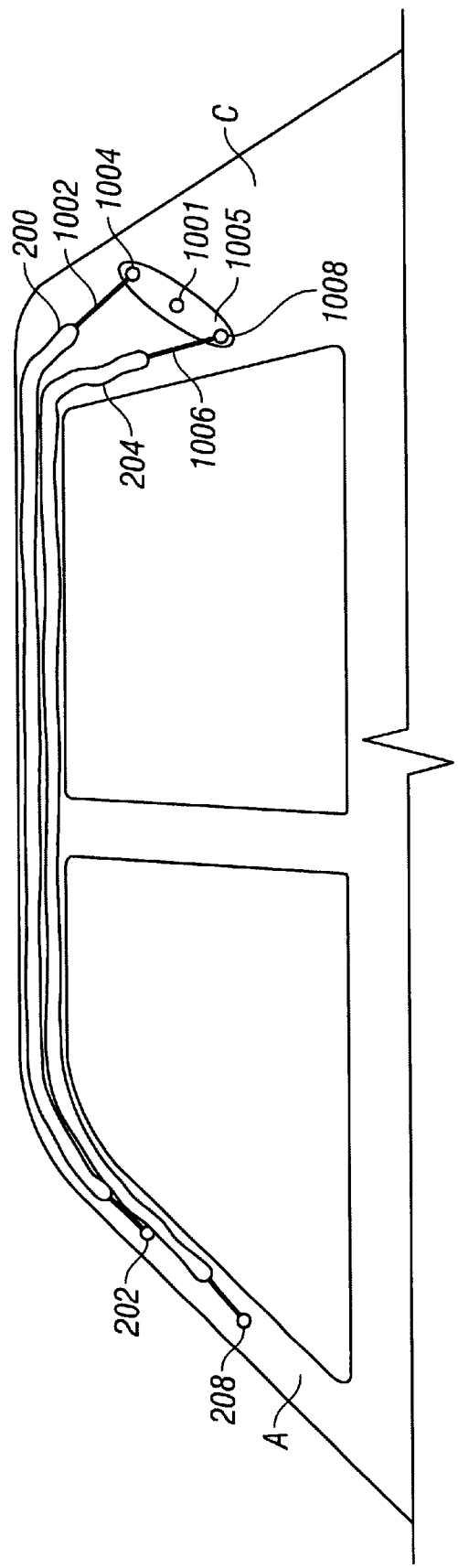
FIG. 10 is a schematic diagram of an embodiment of the inflatable structure system of the present invention, having a pivoting dynamic anchor, and shown in a stowed position, as viewed from inside the vehicle.
Figure 11:
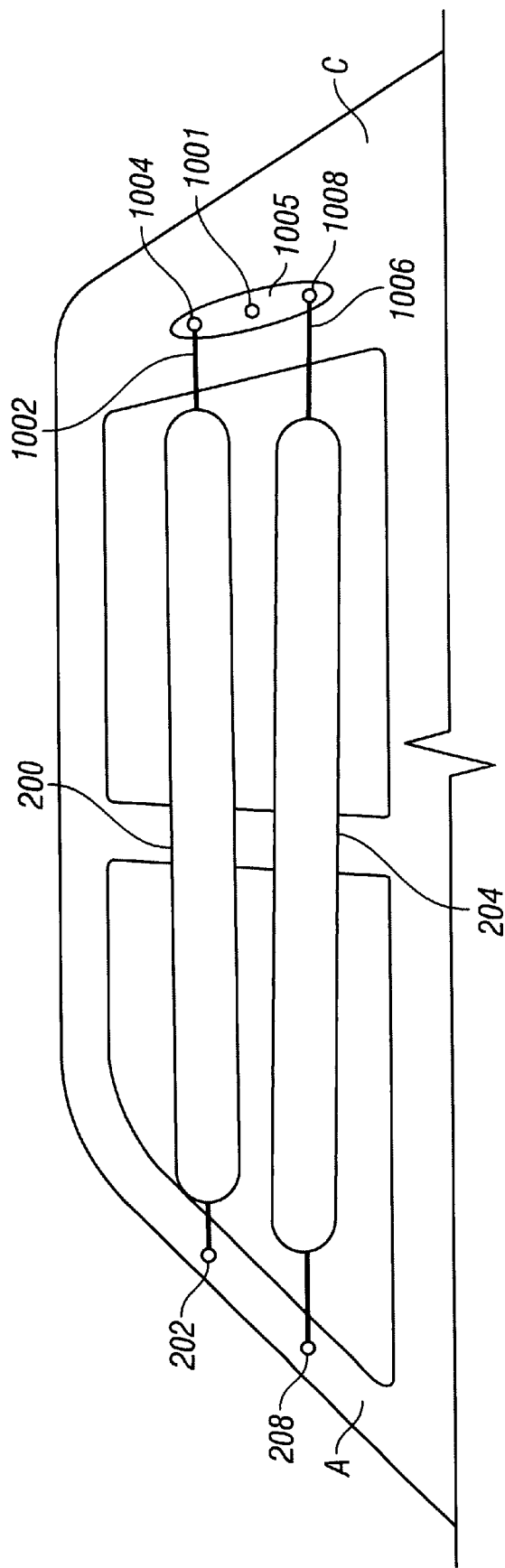
FIG. 11 is a schematic diagram of the inflatable structure system of FIG. 10, shown in a deployed position.

In another embodiment of the present invention, FIGS. 10 and 11 illustrate an inflatable structure system in which the dynamic anchor 1005 is a first-class lever. FIG. 10 shows the system in a stowed condition, while FIG. 11 shows the system deployed. As shown, in this embodiment, dynamic anchor 1005 is attached to C-pillar C, rather than A-pillar A, as in previous embodiments. In turn, in this embodiment, static anchors 202 and 208 are attached to A-pillar A.

Dynamic anchor is pivotally attached to C-pillar C at point 1001. Dynamic anchor 1005 rotates or pivots around point 1001.

Cord 1002 attaches upper inflatable structure 200 to end 1004 of dynamic anchor 1005. Likewise, cord 1006 attaches belt-line inflatable structure 204 to end 1008 of dynamic anchor 1005. Optionally, cords 1002 and 1006 could be one continuous cord strung through or around dynamic anchor 1005. In any case, cords 1002 and 1006 pull on dynamic anchor 1005 when inflatable structures 200 and 204 are inflating. Cords 1002 and 1006 therefore act as the loads on the first-class lever of anchor 1005, applied on opposite sides of the fulcrum (point 1001). Dynamic anchor 1005 can pivot back in forth, similar to the action of a seesaw or teeter-totter. In this manner, dynamic anchor 1005 equalizes axial tension between upper inflatable structure 200 and belt-line inflatable structure 204.

In addition to equalizing axial tension, dynamic anchor 1005 provides flexibility in positioning inflatable structures 200 and 204 for stowing and deployment. Specifically, as shown in FIG. 10, dynamic anchor 1005 can pivot to provide a more favorable stowed position. For example, by pivoting, anchor 1005 can shorten the length of the stowed belt-line inflatable structure 204, thereby reducing strain on the material of belt-line structure 204 while it remains stowed. Upon deployment, as shown in FIG. 11, dynamic anchor 1005 pivots to a different position in response to the tension drawn by the inflating structures 200 and 204. Inflatable structures 200 and 204 pull on opposite sides (1004 and 1008, respectively) of anchor 1005 (i.e., the lever) around point 1001 (i.e., the fulcrum of the lever). In pulling against each other, inflatable structures 200 and 204 reach an equilibrium tension. Optionally, dynamic anchor 1005 could also include a locking mechanism that prevents anchor 1005 from moving after the axial tensions of inflatable structures 200 and 204 reach equilibrium.

The present invention is not limited to specific vehicle geometries, though it is most advantageous in vehicles requiring a high proportion of stowed inflatable structure length to deployed inflatable structure length, as is the case, for example, in vehicles with tall but narrow window openings. The present invention is also not limited to specific inflatable structure diameters or shapes. The diameters and shapes of the upper inflatable structure and the belt-line inflatable structure can be the same or different. In any case, the inflatable structure system still attains an equilibrium between the axial tension of the upper inflatable structure and the axial tension of the belt-line inflatable structure.

In all embodiments of the present invention, the exact dimensions and placement of the inflatable structures, the dynamic anchors, and the static anchors are designed according to the desired location and configuration of the final inflatable structure deployment. The anchors can be fabricated from metal, plastic, composite, or any other material suitable for resisting the forces developed by the deploying inflatable structure. The components can be manufactured by machining, casting, molding, stamping, or any other suitable fabrication technique.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An inflatable structure system comprising:
    (a) a first static anchor attached to a first member of a vehicle;
    (b) a second static anchor attached to the first member;
    (c) a first inflatable structure attached to the first static anchor;
    (d) a second inflatable structure attached to the second static anchor and connected to the first inflatable structure, such that a serial assembly is formed between the first static anchor and the second static anchor; and (e) at least one dynamic anchor attached to a second member of the vehicle opposite to the first member, wherein the at least one dynamic anchor restrains the serial assembly at an intermediate portion of the serial assembly such that the serial assembly has a first axis between the first static anchor and the at least one dynamic anchor and a second axis between the second static anchor and the at least one dynamic anchor, wherein the at least one dynamic anchor allows the serial assembly to move axially along the first axis and the second axis, and wherein the inflatable structure system is mounted across a window opening of the vehicle, wherein the window opening has a belt-line, wherein the second static anchor is attached to the first member closer to the belt-line than the first static anchor, and wherein the first inflatable structure and the second inflatable structure span the window opening when deployed.

2. The inflatable structure system of claim 1, wherein the at least one dynamic anchor is one of a bushing, a bearing, a pulley, an eyehook, a pin, a roller, a gear, a belt, a track, a D-ring, and a lever.

3. The inflatable structure system of claim 1, wherein the first member is a C-pillar of the vehicle and the second member is an A-pillar of the vehicle.

4. The inflatable structure system of claim 1, wherein the first member is an A-pillar of the vehicle and the second member is a C-pillar of the vehicle.

5. The inflatable structure system of claim 1, wherein the window opening has a roof rail opposite the belt-line, and wherein the inflatable structure system further comprises a shield that is attached to the roof rail and encloses the first inflatable structure and the second inflatable structure, and wherein the shield spans an area of the window opening between the roof rail and the second inflatable structure.

6. The inflatable structure system of claim 1, wherein the window opening has a roof rail opposite the belt-line, and wherein the first inflatable structure and the second inflatable structure are stowed in the roof rail in an uninflated condition.

7. The inflatable structure system of claim 1, wherein the first inflatable structure and the second inflatable structure are joined by a joining cord, and wherein the joining cord wraps around the at least one dynamic anchor.

8. The inflatable structure system of claim 1, wherein the first inflatable structure and the second inflatable structure are a single continuous inflatable structure.

9. The inflatable structure system of claim 1, further comprising a shield that covers the first inflatable structure and the second inflatable structure.

10. The inflatable structure system of claim 1, wherein the at least one dynamic anchor comprises two dynamic anchors.

11. The inflatable structure system of claim 10, wherein a first dynamic anchor of the two dynamic anchors is substantially level with the first static anchor, and a second dynamic anchor of the two dynamic anchors is substantially level with the second static anchor.

12. The inflatable structure system of claim 1, wherein the first inflatable structure and the second inflatable structure are inflatable tubular structures.

13. An inflatable structure system comprising:
(a) a first static anchor attached to a first member of a vehicle;
(b) a second static anchor attached to the first member;
(c) a first inflatable structure attached to the first static anchor;
(d) a second inflatable structure attached to the second static anchor and connected to the first inflatable structure, such that a serial assembly is formed between the first static anchor and the second static anchor; and
(e) at least one dynamic anchor attached to a second member of the vehicle opposite to the first member,
wherein the at least one dynamic anchor restrains the serial assembly at an intermediate portion of the serial assembly such that the serial assembly has a first axis between the first static anchor and the at least one dynamic anchor and a second axis between the second static anchor and the at least one dynamic anchor,
wherein the at least one dynamic anchor allows the serial assembly to move axially along the first axis and the second axis,
wherein the at least one dynamic anchor is a lever having a first end, a second end, and a fulcrum point in between the first end and the second end,
wherein the lever is pivotally attached to the second member at the fulcrum point,
wherein the first inflatable structure is attached to the first end of the lever, and
wherein the second inflatable structure is attached to the second end of the lever.

14. The inflatable structure system of claim 13, wherein the at least one dynamic anchor locks in place after the first inflatable structure and the second inflatable structure are fully deployed.

15. An inflatable structure system comprising:
(a) a first static anchor attached to a first member of a vehicle;
(b) a second static anchor attached to the first member;
(c) a first inflatable structure attached to the first static anchor;
(d) a second inflatable structure attached to the second static anchor and connected to the first inflatable structure, such that a serial assembly is formed between the first static anchor and the second static anchor; and
(e) at least one dynamic anchor attached to a second member of the vehicle opposite to the first member,
wherein the at least one dynamic anchor restrains the serial assembly at an intermediate portion of the serial assembly such that the serial assembly has a first axis between the first static anchor and the at least one dynamic anchor and a second axis between the second static anchor and the at least one dynamic anchor,
wherein the at least one dynamic anchor allows the serial assembly to move axially along the first axis and the second axis, and
wherein the at least one dynamic anchor adjusts to different positions.

16. An inflatable structure system comprising:
(a) a first static anchor attached to a first member of a vehicle;
(b) a second static anchor attached to the first member;
(c) a first inflatable structure attached to the first static anchor;
(d) a second inflatable structure attached to the second static anchor and connected to the first inflatable structure, such that a serial assembly is formed between the first static anchor and the second static anchor; and (e) at least one dynamic anchor attached to a second member of the vehicle opposite to the first member,
wherein the at least one dynamic anchor restrains the serial assembly at an intermediate portion of the serial assembly such that the serial assembly has a first axis between the first static anchor and the at least one dynamic anchor and a second axis between the second static anchor and the at least one dynamic anchor,
wherein the at least one dynamic anchor allows the serial assembly to move axially along the first axis and the second axis, and
wherein the at least one dynamic anchor comprises one dynamic anchor that keeps the first inflatable structure and the second inflatable structure substantially level when the first inflatable structure and the second inflatable structure deploy.

17. A method for protecting an occupant against impact and ejection across a vehicle window opening,
the vehicle window opening having a first member on one side, a second member on another side, a first static anchor and a second static anchor mounted on the first member, and at least one dynamic anchor mounted on the second member,
wherein an inflatable structure serial assembly is attached to the first static anchor and the second static anchor,
wherein an intermediate portion of the serial assembly is restrained with the at least one dynamic anchor, thereby creating a first axis of the serial assembly between the first static anchor and the at least one dynamic anchor and a second axis of the serial assembly between the second static anchor and the at least one dynamic anchor, and allowing the serial assembly to move axially along the first axis and the second axis, and
wherein the method comprises the steps of:
inflating the serial assembly such that the serial assembly reduces substantially in length;
providing a first inflatable structure between the first static anchor and the at least one dynamic anchor and a second inflatable structure between the second static anchor and the at least one dynamic anchor, wherein the vehicle window opening has a belt-line, wherein the second static anchor is attached to the first member closer to the belt-line than the first static anchor, and wherein the first inflatable structure and the second inflatable structure span the vehicle window opening when deployed; and
equalizing tensions of the serial assembly along the first axis and the second axis.

18. The method of claim 17, wherein the window opening has a roof rail at its top, and wherein, prior to the step of inflating, the method further comprises the step of stowing the serial assembly in the roof rail.

19. The method of claim 17, wherein the window opening has a roof rail at its top, wherein a shield is attached to the roof rail, wherein the shield encloses the serial assembly, and wherein the method further comprises the step of covering, upon deployment, an area of the window opening from the roof rail to the second inflatable structure.

20. The method of claim 17, wherein the inflatable structure serial assembly comprises one of:
two inflatable structures connected in series, and
one continuous inflatable structure that is pinched at the at least one dynamic anchor.

21. The method of claim 17, wherein the inflatable structure serial assembly comprises two inflatable structures joined by a cord, and wherein the cord is wrapped around the at least one dynamic anchor.

22. The method of claim 17, wherein the inflatable structure serial assembly comprises a first inflatable structure connected in series to a second inflatable structure,
wherein the at least one dynamic anchor comprises a lever pivotally attached to the second member, the lever having a first end and a second end on opposite sides of the pivotal attachment, and
wherein the first inflatable structure is attached to the first end of the lever and the second inflatable structure is attached to the second end of the lever.

23. An inflatable structure system that provides occupant impact and ejection protection across a vehicle window opening, the system comprising:
(a) a first static anchor mounted on a first vehicle structure at a first position, wherein the first vehicle structure is positioned on a side of the vehicle window opening, and wherein the vehicle window opening has a roof rail at its top and a belt-line at its bottom;
(b) a second static anchor mounted on the first vehicle structure at a second position, wherein the second position is closer to the belt-line than the first position;
(c) at least one dynamic anchor mounted on a second vehicle structure opposite to the first vehicle structure;
(d) an upper inflatable structure attached to the first static anchor and attached to a joining cord; and
(e) a lower inflatable structure attached to the second static anchor and attached to the joining cord, wherein the joining cord is wrapped around the at least one dynamic anchor, and wherein the upper inflatable structure and the lower inflatable structure span the vehicle window opening when deployed.

24. The inflatable structure system of claim 23 further comprising:
(f) a shield attached to the roof rail, wherein the shield encloses the lower inflatable structure, and wherein upon deployment the shield covers an area of the vehicle window opening from the roof rail to the lower inflatable structure.

25. The inflatable structure system of claim 23, wherein the upper inflatable structure and the belt-line inflatable structure stow in the roof rail before deployment.

26. The inflatable structure system of claim 23, wherein the at least one dynamic anchor is a first dynamic anchor and a second dynamic anchor, and wherein the first dynamic anchor is substantially level with the first static anchor and the second dynamic anchor is substantially level with the second static anchor.

27. The inflatable structure system of claim 23, wherein the at least one dynamic anchor is one of a bushing, a bearing, a pulley, an eyehook, a pin, a roller, a gear, a belt, a track, a D-ring, and a lever.

28. The inflatable structure system of claim 23, wherein the upper inflatable structure and the lower inflatable structure are inflatable tubular structures.

29. The inflatable structure system of claim 23, wherein the at least one dynamic anchor adjusts to different positions.

30. An inflatable structure system that provides occupant impact and ejection protection across a vehicle window opening, the system comprising:
(a) a first static anchor attached to a first vehicle structure, wherein the first vehicle structure is positioned on a side of the vehicle window opening, and wherein the vehicle window opening has a roof rail at its top and a belt-line at its bottom;

(b) a second static anchor attached to the first vehicle structure closer to the belt-line than the first static anchor;

(c) at least one dynamic anchor attached to a second vehicle structure opposite to the first vehicle structure; and (d) an inflatable structure attached to the first static anchor and the second static anchor,
wherein the inflatable structure is wrapped around the at least one dynamic anchor,
wherein, upon deployment, the inflatable structure is pinched by the at least one dynamic anchor to provide an upper inflatable portion between the first static anchor and the at least one dynamic anchor and a lower inflatable portion between the second static anchor and the at least one dynamic anchor, and
wherein the upper inflatable portion and the lower inflatable portion span the vehicle window opening when deployed.

31. The inflatable structure system of claim 30, wherein the at least one dynamic anchor comprises one dynamic anchor that keeps the upper inflatable portion and the lower inflatable portion substantially level during deployment.

32. The inflatable structure system of claim 30, wherein, before deployment, the inflatable structure is stowed in the roof rail.

33. The inflatable structure system of claim 30, further comprising a shield attached to the roof rail, wherein the shield encloses the inflatable structure.

34. An inflatable structure system that provides occupant impact and ejection protection across a vehicle window opening, the vehicle window opening having a roof rail at its top and a belt-line at its bottom, the system comprising:

(a) a first static anchor attached to a first vehicle structure;

(b) a second static anchor attached to the first vehicle structure closer to the beltline than the first static anchor;

(c) a lever pivotally attached to a second vehicle structure opposite to the first vehicle structure, wherein the lever has a first end and a second end on opposite sides of the pivotal attachment;

(d) an upper inflatable structure attached to the first static anchor and attached to the first end of the lever; and (e) a lower inflatable structure attached to the second static anchor and attached to the second end of the lever.

35. The inflatable structure system of claim 34, wherein the lever is of a length that keeps the upper inflatable structure and the lower inflatable structure substantially level upon deployment.

36. The inflatable structure system of claim 34, wherein the upper inflatable structure and the lower inflatable structure are stowed in the roof rail.

37. The inflatable structure system of claim 34, wherein the lever locks in place after the upper inflatable structure and the lower inflatable structure are fully deployed.

38. The inflatable structure system of claim 34, wherein the upper inflatable structure and the lower inflatable structure are inflatable tubular structures.

39. An inflatable structure system that protects an occupant against impact and ejection across a vehicle window opening, the system comprising:

(a) means for statically attaching a first end and a second end of an inflatable structure serial assembly to a first member of a vehicle, wherein the first member is positioned on a side of the vehicle window opening and a second member is positioned on another side of the window opening, wherein the vehicle window opening has a roof rail at its top and a belt-line at its bottom, and wherein the second end is attached to the first member closer to the belt-line than the first end;

(b) means for dynamically anchoring an intermediate portion of the serial assembly to the second member to create a first axis of the serial assembly between the first end and the means for dynamically anchoring and a second axis of the serial assembly between the second end and the means for dynamically anchoring, such that the serial assembly can move axially along the first axis and the second axis; and (c) means for inflating the serial assembly such that the serial assembly reduces substantially in length,
thereby providing a first inflatable structure between the first end and the means for dynamically anchoring, and a second inflatable structure between the second end and the means for dynamically anchoring,
wherein tensions of the serial assembly along the first axis and the second axis are substantially equal, and
wherein the first inflatable structure and the second inflatable structure span the vehicle window opening when deployed.

* * * * *